United States Patent Office 3,111,497
Patented Nov. 19, 1963

3,111,497
AQUEOUS POLYVINYL ALCOHOL COATING COMPOSITION CONTAINING ALUMINUM GLITTER PIGMENT
Justin Haas, Cincinnati, Ohio, assignor, by mesne assignments, to Kenner Products Company, a corporation of Delaware
No Drawing. Filed Aug. 12, 1960, Ser. No. 49,139
5 Claims. (Cl. 260—29.6)

This invention relates to a composition which is suitable for making ornamental surface decorations. The composition is particularly designed and intended for use by children for coloring drawings or applying ornamental surface finishes to various and sundry objects.

The composition of this invention is a water solution of a transparent resin in which so called "glitter" is dispersed. This "glitter" consists of bright, reflective, unusually colored, metal particles such as minute flakes of shiny sheet aluminum which may be anodized, stained, lacquered, or otherwise colored to provide a glittering appearance. It is contemplated that a set of glitter paints should include anywhere from three to six different glitter colors.

The advantage of the water solution is that the glitter paint is non-stainable, non-toxic, non-inflammable, and does not permanently dry out. In other words, the solution can be reconstituted by adding water. Thus, the glitter paint can be cleaned from any surface on which it is spilled by the application of water and, if the paints dry in their containers, the solution can be restored by adding water and mixing.

In this invention the identity of the resin which serves as a binder for the glitter particles after the drying of the paint is of critical importance. The preferred resin of the present invention is polyvinyl alcohol, such as "Evanol," the trademark name used by E. I. du Pont de Nemours, Inc. of Wilmington, Delaware, for polyvinyl alcohol resins. Similar polyvinyl alcohol resins are manufactured by numerous other companies.

Polyvinyl alcohol is manufactured by hydrolyzing polyvinyl acetate and the degree of hydrolysis is of critical importance because the water solubility of polyvinyl alcohol is primarily a function of the degree of hydrolysis. The preferred range of hydrolysis for the resins to be used in the glitter paints of this invention is 85 to 91% with about 88% optimum. Strangely, the water solubility of hydrolyzed polyvinyl acetate is not a straight line but a curve and about 88% hydrolysis provides maximum water solubility. The specified range is not absolutely critical because the increase and decrease in water solubility with increasing hydrolysis is gradual, and slightly less water solubility may be acceptable for some products and some purposes. However, the range of substantially 85 to 91 or 92% is particularly recommended.

Another virtue of the polyvinyl alcohol, in addition to its water solubility, is its optical properties. The polyvinyl alcohol is very clear and has an index of refraction of about 1.5. In other words, a film of dried polyvinyl alcohol solution is somewhat sparkling and hence this resin augments rather than diminishes the sparkle or glitter of the flaked metal.

Another important property of a glitter paint is its viscosity, which must be such that the paint may be applied as a layer, which is relatively thick in comparison with a film. This layer must not flow or slide. The inherent viscosity of the polyvinyl alcohol is primarily a function of its molecular weight, but the concentration of the resin in the water solution and the ratio of resin and glitter also are important in respect to viscosity. All of these factors may be determined and adjusted in relation to one another to provide a glitter paint which has the viscosity characteristics of the preferred glitter paint of this invention.

Polyvinyl alcohol is offered for sale in a number of different grades which vary from one another according to viscosity and degree of hydrolysis. The viscosity of the available commercial grades of polyvinyl alcohol vary from four to sixty-five centipoises in 4% water solution at 20° C., as determined by means of the Hoeppler falling ball method. A solution of any given or desired viscosity within the specified range may be obtained either by using a polyvinyl alcohol of the exact molecular weight to provide the desired viscosity or by blending higher or lower molecular weight polyvinyl alcohols to provide an equivalent viscosity.

Preferably, the polyvinyl alcohol used in the glitter pigment of this invention has a viscosity (determined as specified) in the range of about fifteen to thirty centipoises with twenty to twenty-five centipoises preferable. However, as indicated, the viscosity of the final glitter paint is more important than the inherent viscosity of the resin solution.

From the point of view of the ornamental appearance of the glitter paint, the ratio of metal flake to resin is relatively important. This ratio should be substantially 20 to 40% metal flake to 80 to 60% resin solution. The layer of this decoration after drying has the proper and best optical properties if the ratio of metal flake to resin is in, or approximates, the specified range.

The concentration of resin in the aqueous phase of the paint may vary substantially depending on the inherent viscosity of polyvinl alcohol, but I have determined that the viscosity of the solution of the polyvinyl alcohol in water, without other ingredients, should be in the general range of 400 to 600 centipoises at 77° F. when subjected to the specified type of viscosity test. I prefer to use a polyvinyl alcohol, the inherent viscosity of which is such that the desired viscosity is attained by substantially 5 to 10% concentration in aqueous solution.

The utility and advantage of the glitter paint of the type described will be better understood in relation to a consideration of the factors involved in a typical application of the ornamental composition. For instance, in a child's glitter paint set there may be an outline drawing of a fairy princess wearing a crown. The child is to apply the glitter composition to the crown. The composition must be sufficiently heavy or viscous to be controllable when applied within the confines of outlines not to run over the edges of the outlines. The layer must be thick enough to provide a glittering opaque deposit after drying, but it is not desirable to have the layer thicker than necessary to provide the desired hiding power. In other words, I have adjusted the pertinent variables to provide a glitter composition which a child can use successfully to provide a highly ornamental effect in a case of the type discussed as an example.

Further, the preferred composition of this invention provides an ornamental glitter which adheres to surfaces of all types which is glossy, flexible, transparent, does not become brittle or change color when exposed to sun light or artificial light and which does not become tacky at high humidity or high temperatures. However, this same composition can be readily redissolved in water which is very important, both from the point of view of cleaning spots which may be spilled on garments or furniture, and from the point of view of reconstituting the solution as the compositions dry out in their containers.

In addition to the specified ingredients of the glitter composition, it should contain a plasticizer for the polyvinyl alcohol and a non-toxic ingredient for inhibiting bacterial growth. The preferred plasticizer is propylene glycol. This plasticizer is preferred over other glycols because of its non-toxic properties and may be used to constitute 8–10% of the aqueous solution of polyvinyl alcohol. However, glycerine and various other glycols for instance ethylene and the lower polyethylene glycols may be used. It is also possible to use ethanol acetamide and ethanol formamide as plasticizers. In fact, the entire problem of plasticizing polyvinyl alcohol resin films has been worked out in respect to other uses and applications of polyvinyl alcohol, and any one of a number of satisfactory plasticizers may be used, provided the one chosen does not impair the inherent optical properties of the polyvinyl alcohol.

It is commonplace to use extenders with polyvinyl alcohol, but the use of such extenders while not impossible is not recommended because of their tendency to impair the optical properties of the polyvinyl alcohol. The materials which are available as extenders are discussed in the literature, including the sales literature relevant to the polyvinyl industry, and the incorporation of an extender in the glitter composition of this invention, although not recommended, is not beyond the expected skill of the art.

The glitter itself is preferably constituted by small particles of sheet aluminum. The thickness of the sheet aluminum should be in the range of .0008" to .002", the thinner the better. The diameter of the flakes should be in the range of .02" to .035". A convenient diameter is .025".

The ornamental glitter layer or film, after drying, may be of any desired thickness. If the amount of glitter in the dried film is substantially 60% and the amount of plasticized resin is substantially 40%, then a very thin layer of film suffices to hide the surface below. The ornamental film is constituted by the highly transparent resin having a relatively high index of refraction (about that of quartz) and the reflected chromatic glitter. The over-all opacity of the layer or the hiding power of the layer is due to the glitter itself. The sparkle is due partly to the glitter and partly to the transparent light refracting resin.

If the viscosity of the solution of polyvinyl alcohol in water is in the neighborhood of 500 centipoises, and if an aluminum glitter of the particle size specified is used in the portions specified, then the viscosity of the completed decorative solution is in the range of workability, which has been imperatively determined. This glitter composition may be applied as a thick layer to any definite or discrete area without creeping or flowing over the predetermined boundary lines of the decorated area. Further, the composition may be applied to a vertical surface without sagging or running down. In short, the composition is more like a very mobile or weak solid than like a liquid. Although the viscosity of the solution of the polyvinyl alcohol in water at the desired concentration may vary somewhat from 500 centipoises, it is recommended that this variation should not be greater than 100 centipoises, more or less.

Examples of my invention are as follows:

*Example I*

An aqueous solution having the following composition is made:

| | Percent by weight |
|---|---|
| Water | 83.19 |
| Polyvinyl alcohol 52–22 | 8. |
| Propylene glycol | 8.80 |
| Methyl parahydroxybenzoate | .01 |
| | 100 |

The glitter decoration is constituted by mixing 25% glitter with 75% solution. In this case the glitter is constituted by aluminum particles substantially .025" in diameter and substantially .0008" thick.

*Example II*

An aqueous solution having the following composition is made:

| | Percent by weight |
|---|---|
| Water | 71.19 |
| Polyvinyl alcohol 51–05 | 20. |
| Ethylene glycol | 8.80 |
| Methyl parahydroxybenzoate | .01 |
| | 100 |

This solution is combined with glitter as in the preceding example.

*Example III*

An aqueous solution having the following composition is made:

| | Percent by weight |
|---|---|
| Water | 84.99 |
| Polyvinyl alcohol 50–42 | 7. |
| Polyethylene glycol | 8. |
| Methyl parahydroxybenzoate | .01 |
| | 100 |

Substantially 20% glitter and 80% solution are combined to provide a glitter decoration. In this case the glitter particles are substantially .02" in diameter and .008" in thickness.

*Example IV*

An aqueous solution having the following composition is made:

| | Percent by weight |
|---|---|
| Water | 83.99 |
| Polyvinyl alcohol 52–52 | 8. |
| Glycerine | 8. |
| Methyl parahydroxybenzoate | .01 |
| | 100 |

The glitter decoration is constituted by mixing 40% glitter with 60% solution. In this case the glitter is constituted by aluminum particles substantially .035" in diameter and substantially .002" in thickness.

*Example V*

An aqueous solution having the following composition is made:

| | Percent by weight |
|---|---|
| Water | 83.99 |
| Polyvinyl alcohol 52–52 | 8. |
| Polyethylene glycol | 8. |
| Methyl parahydroxybenzoate | .01 |
| | 100 |

The glitter decoration is constituted as disclosed in Example I.

*Example VI*

An aqueous solution having the following composition is made:

| | Percent by weight |
|---|---|
| Water | 84.19 |
| Polyvinyl alcohol 50–42 | 7. |
| Propylene glycol | 8.8 |
| Methyl parahydroxybenzoate | .01 |
| | 100 |

The glitter decoration is constituted as disclosed in Example I.

In the foregoing formulae the numerical designations of the polyvinyl alcohol are from the Second Edition 1959 Catalog of E. I. du Pont de Nemours & Co., Inc. The numeral 52–22 in Formulae 1, 4, and 5 designates a polyvinyl which is 87–89% hydrolyzed and has a viscosity of 21–25 centipoises in a 4% water solution at 20° C. as determined by means of the Hoeppler falling ball method. The numerical designation of the polyvinyl alcohol in the second formula, namely 51–05, designates a polyvinyl alcohol which is 88–89% hydrolyzed and has a viscosity of 4–6 when determined as specified. The polyvinyl alcohol of Example III is identified by the numerical designation 50–42 which is 87–89 hydrolyzed and has a viscosity of 35–45.

In the foregoing formulae the methyl parahydroxybenzoate serves to inhibit bacterial growth. Any other inhibitor may be used but I consider methyl parahydroxy benzoate desirable because of its non-toxic character. If desired, a small amount of propyl parahydroxybenzoate may be included in the formulae.

In all cases, the components are blended to provide a solution which, when combined with sufficient glitter to provide hiding power, will have a viscosity or mobility such as the composition may be spread in predetermined and controlled areas. In other words, the final product must be sufficiently mobile to spread but not sufficiently mobile to run. In all cases the components are chosen and proportioned to attain this purpose.

The glitter of the decoration of this invention is particularly adapted to be used by children in coloring outline pictures, although it may be used for a multiplicity of decorative purposes.

I claim:
1. A composition of matter adapted to provide upon drying a glittering, reflective layer which adheres to the surface on which it is placed, said composition comprising a water solution of polyvinyl alcohol, said polyvinyl alcohol being about 85 to 92% hydrolyzed polyvinyl acetate, the concentration of polyvinyl alcohol in said solution being substantially 5 to 10%, said solution containing flakes of aluminum, the ratio of said flakes to said solution being about 20 to 40% flakes to 80 to 60% solution, said flakes being bright, reflective aluminum particles of the order of about .02 to .035 inch in diameter, and a plasticizer.

2. The composition of claim 1 wherein the viscosity of the solution, without other ingredients, is in the general range of about 400 to 600 centipoises at 77° F.

3. The composition of claim 1 wherein the aluminum flakes are from .0008 to .002 inch in thickness.

4. The composition of claim 1 wherein said polyvinyl alcohol has a viscosity in the range of about 15 to 30 centipoises.

5. The composition of claim 1 wherein the composition also contains a bacterial growth inhibitor.

References Cited in the file of this patent
UNITED STATES PATENTS

| | | |
|---|---|---|
| 2,362,884 | Clark | Nov. 14, 1944 |
| 2,408,377 | Dangelmajer | Oct. 1, 1946 |
| 2,449,812 | Hervey et al. | Sept. 21, 1948 |
| 2,543,801 | Patterson | Mar. 6, 1951 |
| 2,833,736 | Glaser | May 6, 1958 |
| 2,858,230 | Knoll | Oct. 28, 1958 |
| 2,901,452 | West | Aug. 25, 1959 |
| 3,053,683 | Yolles | Sept. 11, 1962 |